United States Patent
Lin et al.

(10) Patent No.: US 9,212,917 B2
(45) Date of Patent: Dec. 15, 2015

(54) METHOD AND DEVICE FOR MATCHING PUBLIC TRANSPORTATION ROUTE WITH ROAD NETWORK

(71) Applicant: TENCENT TECHNOLOGY (SHENZHEN) COMPANY LIMITED, Shenzhen (CN)

(72) Inventors: Xiaxiang Lin, Shenzhen (CN); Hongying Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/405,040

(22) PCT Filed: Jun. 4, 2013

(86) PCT No.: PCT/CN2013/076692
§ 371 (c)(1),
(2) Date: Dec. 2, 2014

(87) PCT Pub. No.: WO2013/182032
PCT Pub. Date: Dec. 12, 2013

(65) Prior Publication Data
US 2015/0300824 A1    Oct. 22, 2015

(30) Foreign Application Priority Data
Jun. 6, 2012 (CN) .......................... 2012 1 0183960

(51) Int. Cl.
G08G 1/123 (2006.01)
G01C 21/26 (2006.01)
G08G 1/00 (2006.01)

(52) U.S. Cl.
CPC . G01C 21/26 (2013.01); G08G 1/00 (2013.01)

(58) Field of Classification Search
USPC .......................................... 701/532
See application file for complete search history.

(56) References Cited

U.S. PATENT DOCUMENTS

| | | | | |
|---|---|---|---|---|
| 6,636,802 | B1 * | 10/2003 | Nakano ................. | G01C 21/32 701/532 |
| 7,657,372 | B2 * | 2/2010 | Adachi ................ | G06Q 10/047 340/995.14 |
| 7,890,252 | B2 * | 2/2011 | Sekine ................ | G01C 21/3446 701/428 |
| 8,396,660 | B2 * | 3/2013 | Takahata ................ | G01C 21/32 701/450 |
| 2005/0058155 | A1 * | 3/2005 | Mikuriya ............. | H04Q 3/0062 370/474 |
| 2006/0020431 | A1 | 1/2006 | Gipps et al. | |
| 2008/0091344 | A1 * | 4/2008 | Mikuriya .......... | G06F 17/30241 701/450 |

FOREIGN PATENT DOCUMENTS

| | | |
|---|---|---|
| CN | 1573797 A | 2/2005 |
| CN | 101807222 A | 8/2010 |
| CN | 101847322 A | 9/2010 |

OTHER PUBLICATIONS

Search Report in Application No. PCT/CN2013/076692 dated Sep. 5, 2013.

* cited by examiner

Primary Examiner — Hussein A. Elchanti
(74) Attorney, Agent, or Firm — Marshall, Gerstein & Borun LLP

(57) ABSTRACT

According to an embodiment of the present disclosure, a public transport line is divided into segments and a dividing point of each of the segments is determined. A matching vertex set associated with the dividing point on a road network is determined. A road matching the public transport line is determined from the road network, in which the determined road passes a point in each matching vertex set and closed polygons surrounded by the determined road and the public transport line have a smallest sum of areas.

16 Claims, 4 Drawing Sheets

METHOD AND DEVICE FOR MATCHING PUBLIC TRANSPORTATION ROUTE WITH ROAD NETWORK

CROSS-REFERENCE TO RELATED APPLICATIONS

This application is a U.S. National Phase application under 35 U.S.C. §371 of International Application No. PCT/CN2013/076692, filed Jun. 4, 2013, entitled "Method and Apparatus for Matching Public Transport Lines with Road Network", which claims the priority of Chinese Patent Application No. 201210183960.7 filed Jun. 6, 2012, the entire disclosures of which are incorporated herein by reference.

FIELD OF THE INVENTION TECHNOLOGY

Embodiments of the present disclosure relate to the field of traffic information, and more particularly, to a method and apparatus for matching public transport lines with road network.

BACKGROUND OF THE INVENTION DISCLOSURE

Urban public transportation generally refers to all transport modes that provide transport services by way of charging. Of course, there are a few public transport systems that offer free services. A public transport system may include physical elements like roads, vehicles, station facilities, etc. The ratio of the urban public transportation to the total amount of the city's daily travel is increasing. Currently, the popularity of map websites and public travel information platforms may facilitate users to choose a trip plan.

An electronic map is a digital map, which is a map digitally stored and accessed using the computer technology. The electronic map usually uses vector-based images to store information. A map scale of the electronic map can be zoomed in, zoomed out, or rotated without affecting a display quality. Modern electronic map applications generally use geographic information systems to store and transfer map data.

SUMMARY OF THE INVENTION

Embodiments of the present disclosure describe a method for matching public transport lines with a road network, so that a real travelling trajectory of a public transport line is obtained and an error correction rate of the public transport line data is improved.

Embodiments of the present disclosure describe an apparatus for matching public transport lines with a road network, so that a real travelling trajectory of a public transport line is obtained and an error correction rate of the public transport line data is improved.

The technical scheme described in various embodiments of the present disclosure is implemented as follows.

A method for matching public transport lines with a road network, including:

dividing a public transport line into segments and determining a dividing point of each of the segments;

determining a matching vertex set associated with the dividing point on a road network; and determining a road matching the public transport line from the road network;

wherein the determined road passes a point in each matching vertex set and closed polygons surrounded by the determined road and the public transport line have a smallest sum of areas.

An apparatus for matching public transport lines with a road network, including:

a public transport line dividing module, configured to divide a public transport line into segments and determine a dividing point of each of the segments;

a matching vertex set determining module, configured to determine a matching vertex set associated with the dividing point on a road network; and a matching module, configured to determine a road matching the public transport line from the road network;

wherein the determined road passes a point in each matching vertex set and closed polygons surrounded by the determined road and the public transport line have a smallest sum of areas.

As can be seen from the above technical scheme, according to various embodiments of the present disclosure, a public transport line is divided into segments and a dividing point of each of the segments is determined. For each dividing point, a matching vertex set associated with the dividing point on a road network is determined. A road matching the public transport line is determined from the road network, in which the determined road passes a point in each matching vertex set and closed polygons surrounded by the determined road and the public transport line have a smallest sum of areas. When the embodiments of the present disclosure are employed, a surrounding area is configured as a measurement for the matching degree between the public transport line and the road network, so that the public transport line can match the road network, which has advantages like high efficiency, anti-noise, etc. In addition, under the condition of complex road network and the collection of the public transport lines is not accurate enough, the best-matching road is still able to be found.

DETAILED DESCRIPTION OF THE INVENTION DISCLOSURE

Hereinafter, the present disclosure will be described in further detail with reference to the accompanying drawings and exemplary embodiments.

Generally, in electronic map data, public transport line data and road network data are independent of each other. The public transport line data (for example, the public transport line data may be obtained through a Global Positioning System (GPS)) may be represented by a series of coordinates.

The road network data may describe a coordinate sequence of each section of a road and a connection relationship between different road sections. As the collection of the coordinate data is not precise enough or other reasons, in fact, there is a deviation between a public transport line and a line in the road network. In other words, the public transport line does not match the line in the road network. As such, it cannot be directly determined which road sections in the road network the public transport line passes.

Automatically matching the public transport line data with the road network lines (a process of matching the public transport line data with the road network lines may be referred to as road network matching) to obtain information about which road a public transport line most likely passes may have a very large significance for error correction of the public transport line data and planning public transport transfer schemes according to traffic information.

Figure 1:
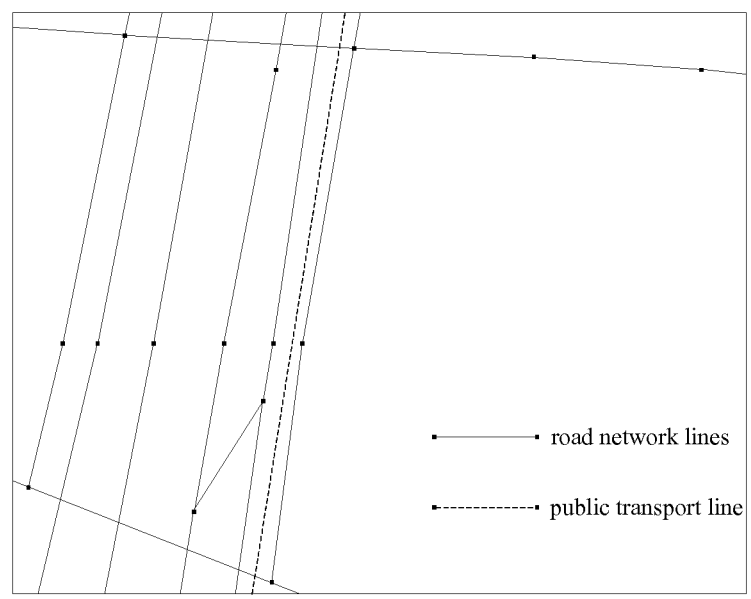
FIG. 1 is a schematic diagram illustrating a conventional situation where a public transport line does not match a road network, according to an example embodiment of the present disclosure.

FIG. 1 is a schematic diagram illustrating a conventional situation where a public transport line does not match the road network, according to an example embodiment of the present disclosure. The diagram shows an actual road network of a city, in which the public transport line is represented by a dashed line and actual roads in the road network are represented by solid lines.

As can be seen from FIG. 1, there is a deviation between the public transport line and road network lines. In addition, there are multiple road network lines parallel to the public transport line, in which directions of the multiple road network lines are same. As such, it is difficult to directly determine which road sections the public transport line passes.

In various embodiments of the present disclosure, considering the complexity of the road network, a candidate matching road section associated with a public transport line may be determined. An area of a polygon surrounded by the candidate matching road section and the public transport line may be configured as a standard for determining a matching cost. In various embodiments of the present disclosure, the road network is abstractly constructed as a directed and weighted connected graph. In addition, strategies like segmentation processing and direction filtering are employed. As such, candidate routes are optimized and the matching between the public transport line and the road network is effectively improved.

According to an embodiment of the present disclosure, the whole road network may be configured as a directed connected graph, in which each road section is a directed edge and edges are connected by vertexes. A result of matching the public transport line with the road network is a result of connecting some road sections end to end. Intuitively, the road sections matching the public transport line may be close to the public transport line and may have a direction which is the same as that of the public transport line. In the road sections matching the public transport line, adjacent road sections are connected end to end, and all of the connected road sections form a shape similar with that of the public transport line.

Figure 2:
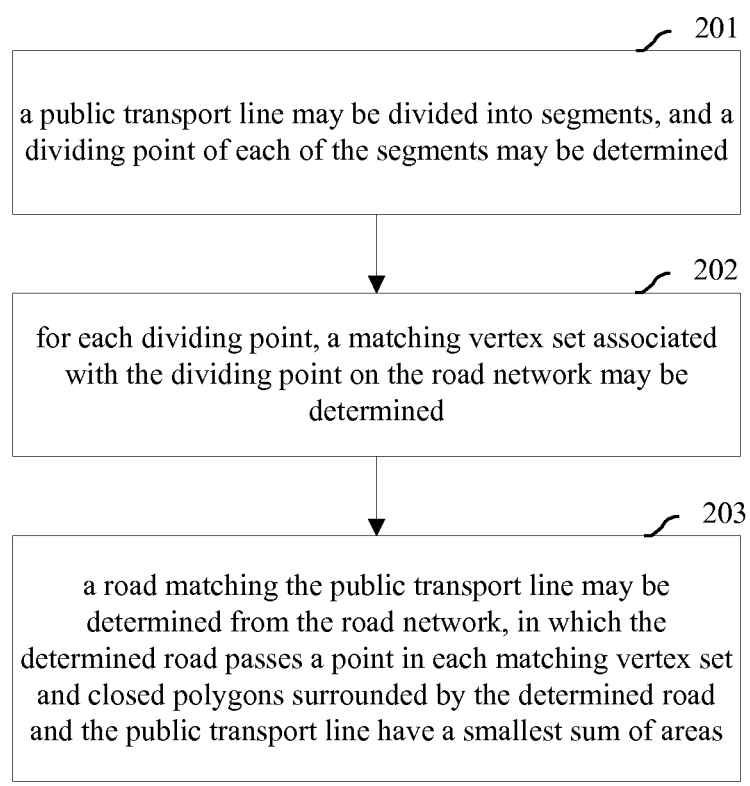
FIG. 2 is a flowchart illustrating a method for matching public transport lines with a road network, according to an example embodiment of the present disclosure.

FIG. 2 is a flowchart illustrating a method for matching public transport lines with a road network, according to an example embodiment of the present disclosure. As shown in FIG. 2, the method may include following operations.

At block 201, a public transport line may be divided into a plurality of segments, and a dividing point of each segment may be determined.

According to an example embodiment of the present disclosure, the public transport line is formed by a series of coordinates. In an embodiment, coordinates of a predetermined number of points may be extracted from the series of the coordinates. In another embodiment, coordinates of a random number of points may be extracted from the series of the coordinates. The extracted points may be configured as dividing points of the segments of the public transport line. Any two adjacent dividing points may construct a segment of the public transport line.

According to an embodiment of the present disclosure, the more the dividing points are extracted, the higher the accuracy of subsequent matching calculation is and the greater the corresponding calculation amount is. The less the dividing points are extracted, the lower the accuracy of the subsequent matching calculation is and the smaller the corresponding calculation amount is. As such, the number of the dividing points may be determined according to actual requirements, so that a compromise relationship between the matching accuracy and the calculation amount is comprehensively considered.

At block 202, for each dividing point, a set of matching vertexes associated with the dividing point on the road network may be determined.

According to an embodiment of the present disclosure, after a dividing point is extracted from the public transport line, the dividing point is mapped to the road network. A point on the road network mapping to the dividing point may be referred to as a matching vertex associated with the dividing point. According to an embodiment of the present disclosure, there may be more than one matching vertex on the road network associated with a dividing point. A set constructed by all of the matching vertexes of the dividing point is called a matching vertex set of the dividing point. According to an embodiment of the present disclosure, the matching vertex set may be a set of all possible points obtained by matching the dividing point to the road network.

Since there may be more than one matching vertex associated with the dividing point on the road network, a radius threshold may be configured to reduce the calculation amount. For each dividing point, a set of matching vertexes of the dividing point within the range of the radius threshold on the road network may be determined.

For example, a same radius threshold, e.g., 50 meters, may be configured for all of the dividing points. For each dividing point, a circle of which a radius is 50 meters is drawn on the road network of an electronic map taking the dividing point as a center of the circle. A point within the circle may be likely to become a matching vertex of the dividing point.

According to an embodiment of the present disclosure, a same radius threshold may be configured for all of the dividing points. According to another embodiment of the present disclosure, different radius threshold may be configured for different dividing points.

For example, assuming there are a dividing point A and a dividing point B, based on the actual calculation requirements, a radius threshold like 50 meters may be configured for the dividing point A, and a radius threshold like 100 meters may be configured for the dividing point B.

At block 203, a road line matching the public transport line may be determined from the road network, in which the determined road line passes one point in the matching vertex set of each dividing point and a closed polygon surrounded by the determined road line and the public transport line has the smallest area. In this case, the closed polygon is constructed by connecting a start point of the determined road line to a start point of the public transport line and connecting an end point of the determined road line to an end point of the public transport line.

When the dividing point and the matching vertex set of the dividing point are determined, a matching vertex may be selected from the matching vertex set of each dividing point, and the selected matching vertexes may be connected to construct a plurality of candidate matching road sections. Areas of closed polygons surrounded by the public transport line and all of the candidate matching road sections are calculated. In this case, some candidate matching road sections are connected end to end to form a road which matches the public transport line best, in which closed polygons surrounded by these candidate matching road sections and the public transport line have a smallest sum of areas.

According to an embodiment of the present disclosure, a vertical line is made from each point in the matching vertex set of each dividing point to the public transport line. As such, the vertical line, a connection line between matching vertexes, and the public transport line may form multiple closed polygons. Then the road matching the public transport line may be determined from the road network. In this case, the determined matching road passes a point in the matching vertex set of each dividing point, and multiple closed polygons surrounded by the matching road and the public transport line have a smallest sum of areas. According to an embodiment of the present disclosure, a point may be determined from each matching vertex set and the determined points may form a road, in which multiple closed polygons surrounded by the road and the public transport line have a smallest sum of areas.

Figure 3:
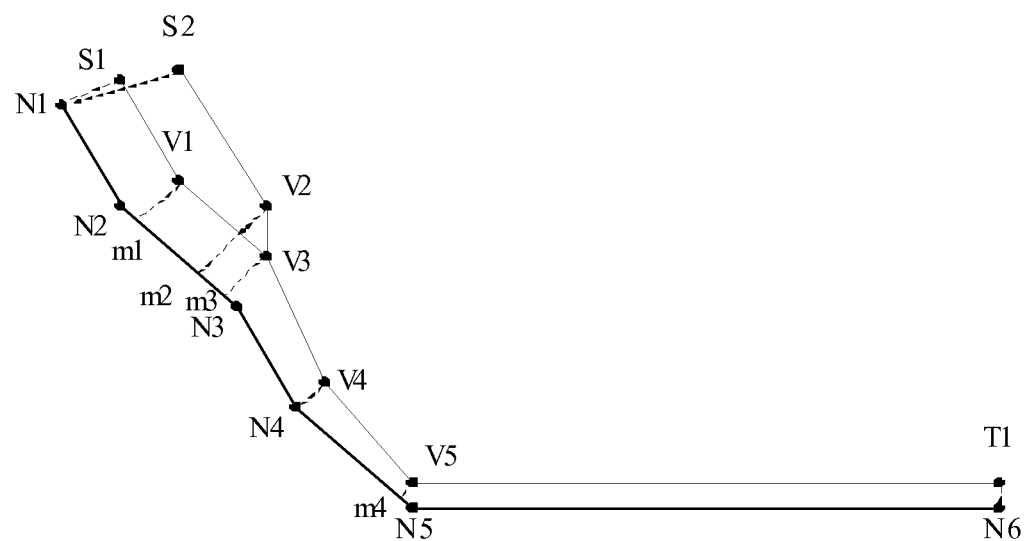
FIG. 3 is a schematic diagram illustrating a situation where a public transport line matches the road network, according to an example embodiment of the present disclosure.

FIG. 3 is a schematic diagram illustrating a situation where a public transport line matches the road network, according to an example embodiment of the present disclosure.

As shown in FIG. 3, a thick line (i.e., N1-N2-N3-N4-N5-N6) represents a public transport line, thin lines (i.e., S1-V1-V3-V4-V5-T1 and S2-V2-V3-V4-V5-T1) represent a road network. A vertical line may be made from each matching vertex to the public transport line (i.e., dashed lines as shown in FIG. 3). As such, the vertical lines, the public transport line, connection lines between the matching vertexes, and the road network surround multiple closed polygons.

In the public transport line (N1-N2-N3-N4-N5-N6), there are six dividing points, i.e., N1, N2, N3, N4, N5, and N6. In this case, a matching vertex set of a start point N1 includes S1 and S2; a matching vertex set of N2 includes V1; a matching vertex set of N3 includes V2 and V3; a matching vertex set of N4 includes V4; a matching vertex set of N5 includes V5; and a matching vertex set of an end point N6 includes T1.

The vertical lines may be made from each of the matching vertexes V1, V2, V3, V4, and V5 to the public transport line. Intersection points of the vertical lines and the public transport line are m1, m2, m3, N4, and m4. Since N1 and N6 respectively are the start point and the end point of the public transport line, S1 and S2 may be directly connected with N1, and T1 may be directly connected with N6.

In the embodiment of the present disclosure, polygons surrounded by the road S1→V1→V3→V4→V5→T1 and the public transport line may include N1S1V1$m$1, $m$1V1V3$m$3, m3V3V4N4, N4V4V5$m$4, and $m$4V5T1N6.

In the embodiment of the present disclosure, polygons surrounded by the road S2→V2→V3→V4→V5→T1 and the public transport line may include N1S2V2$m$2, $m$2V2V3$m$3, m3V3V4N4, N4V4V5$m$4, and $m$4V5T1N6.

As may be seen from FIG. 3, a sum of areas of the polygons surrounded by the road S1→V1→V3→V4→V5→T1 and the public transport line (i.e., a sum of areas of the polygons including N1S1V1$m$1, $m$1V1V3$m$3, m3V3V4N4, N4V4V5$m$4, and $m$4V5T1N6) is smaller than a sum of areas of the polygons surrounded by the road S2→V2→V3→V4→V5→T1 and the public transport line (i.e., a sum of areas of the polygons including N1S2V2$m$2, $m$2V2V3$m$3, m3V3V4N4, N4V4V5$m$4, and $m$4V5T1N6).

Therefore, S1→V1→V3→V4→V5→T1 is a better matching road compared with S2→V2→V3→V4→V5→T1.

In summary, for two adjacent dividing points, two matching vertexes respectively selected from a matching vertex set of each of the two adjacent dividing points may form a road section L. Vertical lines may be made from the matching vertexes of the road section L to the public transport line to form a closed polygon, and an area of the closed polygon may be configured as a measure of a matching degree (e.g., denoted as M). A matching degree of a whole matching result may be measured by a sum of values of M of all road sections on the road. As such, the operation of determining the road matching the public transport line from the road network may be implemented as follows. A sequence of connected road sections may be determined from the road network, e.g., L1, L2, ..., and Ln, in which M(L1), M(L2), ..., and M(Ln) have a smallest sum.

According to an example embodiment of the present disclosure, for each edge L in the road network, a corresponding M(L) may be calculated as a weight of each edge. For the start point of the public transport line, there may be a plurality of possible start points which form a candidate vertex set S. Similarly, for the end point of the public transport line, there may be a plurality of possible end points which form a candidate vertex set T. As such, the determining of the road matching the public transport line from the road network may be implemented as determining, from a directed acyclic graph constructed by the road network, a path from S to T with a minimum weight, which is a typical multi-source shortest path problem. As such, the shortest path algorithm may be applied to determine the road matching the public transport line from the road network.

The algorithm solving the shortest path problem is called the "shortest path algorithm", which is referred to as "path algorithm" sometimes. The most commonly-used path algorithms may include Dijkstra algorithm, A* algorithm, SPFA algorithm, Bellman-Ford algorithm, Floyd-Warshall algorithm, and the like.

According to an embodiment of the present disclosure, the Dijkstra algorithm may be employed. The Dijkstra algorithm is a typical shortest path algorithm, which is used to calculate the shortest paths from a node to all of other nodes. Characteristics of the Dijkstra algorithm mainly include expanding outwards layer by layer from a start point until an end point is reached.

According to an embodiment of the present disclosure, in order to improve the efficiency of the algorithm, the whole road network may not be considered. Instead, a pre-processing may be performed and an edge from which a distance to the public transport line is within a specific range is considered.

According to an embodiment of the present disclosure, the matching result is good when the public transport line does not intersect with itself.

When the public transport line intersects with itself, various embodiments of the present disclosure provide further improvements, which are described below.

Figure 4:
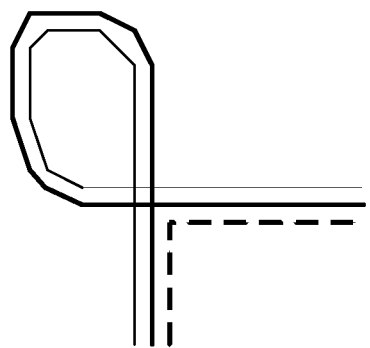
FIG. 4 is a schematic diagram illustrating self-intersection of a public transport line, according to an example embodiment of the present disclosure.

FIG. 4 is a schematic diagram illustrating self-intersection of a public transport line, according to an example embodiment of the present disclosure.

As shown in FIG. 4, the public transport line is represented as a thick line. The public transport line intersects with itself, which belongs to a self-intersected public transport line.

When the self-intersection occurs on the public transport line, a wrong calculation result may be obtained if still using the shortest path algorithm to calculate the matching road. For example, referring to FIG. 4 again, the thick line represents the public transport line and a dashed line represents a candidate matching route. According to the shortest path algorithm, a closed polygon surrounded by the candidate matching route and the public transport line has a smaller area. As a result, the shortest path finally calculated is the candidate matching route represented by the dashed line. However, in fact this dashed line does not exist in the actual road network. As such, when the public transport line intersects with itself, a road matching error may occur if still using the shortest path algorithm to perform the road matching.

To solve the problem as described above, according to an embodiment of the present disclosure, when dividing points are selected, the public transport line may be divided into several segments, in which each segment does not intersect with itself. Then the shortest path algorithm is applied as a whole. As such, the road matching error resulting from the self-intersection of the public transport line can be avoided.

According to an embodiment of the present disclosure, in order to obtain an overall best matching scheme, a cumulative weight of each candidate vertex may be recorded. When a next shortest path is calculated, the cumulative weight is considered. In this case, the cumulative weight of the candidate vertex may be defined to mean the length of a shortest path from the start point of the line to the candidate vertex. When a shortest path between a vertex set A and a vertex set B respectively corresponding to a dividing point a and a dividing point b which are two adjacent dividing points is calculated, a cumulative weight of each vertex in the set A is calculated. As such, when calculating from the start point to the end point, a shortest path passing the candidate vertexes of all dividing points between the candidate vertex set S associated with the start point of the public transport line and the candidate vertex set T associated with the end point of the public transport line is calculated. In other words, the best matching route is obtained.

Figure 5:
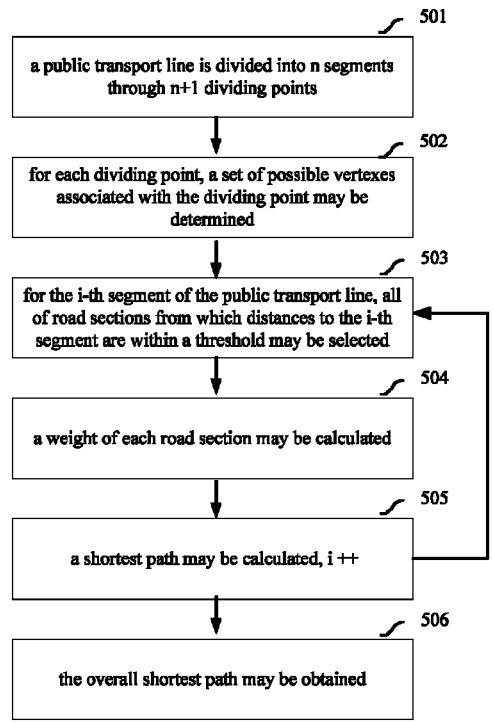
FIG. 5 is a schematic flowchart illustrating a method for matching public transport lines with a road network, according to an example embodiment of the present disclosure.

FIG. 5 is a schematic flowchart illustrating a method for matching public transport lines with a road network, according to an example embodiment of the present disclosure.

As shown in FIG. 5, the method may include following operations.

At block 501, n+1 points may be selected from a series of coordinates of public transport line data, so that a public transport line is divided into n segments.

According to an embodiment of the present disclosure, the n+1 points may be called dividing points, e.g., denoted as $P_1$, $P_2$, ..., $P_{n+1}$. In this case, the first point is a start point of the public transport line and the last point is an end point of the public transport line. As such, the public transport line is divided into n segments, in which each segment does not intersect with itself. As such, the road matching error resulting from the self-intersection of the public transport line can be avoided.

At block 502, for each dividing point of the public transport line, a set of possible road network vertexes associated with the dividing point may be determined according to a preconfigured radius threshold.

In this case, it may be assumed that road network vertex sets of $P_1$, $P_2$, ..., and $P_{n+1}$ respectively are $S_1$, $S_2$, ..., and $S_{n+1}$. The processing may be started from the first segment of the public transport line. A cumulative weight of each vertex in $S_1$ may be configured as 0. Here, for each vertex in $S_1$, the cumulative weight of the vertex is equal to the length of a shortest path from $S_1$ to the vertex. Therefore, for each vertex in $S_1$, the cumulative weight of the vertex is equal to 0.

At block 503, when the i-th segment of the public transport line is processed, all of road sections from which distances to the i-th segment are within the radius threshold may be selected. For a selected road section, an area of a closed polygon surrounded by the road section and the i-th segment of the public transport line may be calculated, and the area may be configured as a weight M of the road section.

At block 504, the multi-source shortest path algorithm may be applied between $S_1$ and $S_{i+1}$ to calculate shortest paths from $S_1$ to each vertex in $S_{i+1}$, so as to obtain a cumulative weight of each vertex in $S_{i+1}$.

At block 505, when i is equal to n, the algorithm is finished and the obtained shortest paths form a sequence of best-matching road sections. Otherwise, i is configured as i+1, and the operations at block 503 are performed.

At block 506, the shortest paths obtained at block 505 may be determined as the best-matching sequence of road sections, and output to a user.

Based on the above descriptions, various embodiments of the present disclosure further describe an apparatus for matching a public transport line with a road network.

Figure 6:
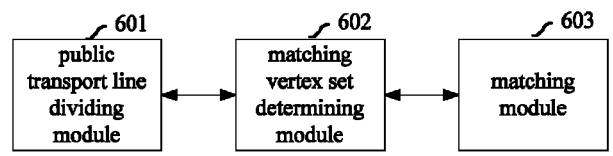
FIG. 6 is a schematic diagram illustrating a structure of an apparatus for matching public transport lines with a road network, according to an example embodiment of the present disclosure.

FIG. 6 is a schematic diagram illustrating a structure of an apparatus for matching public transport lines with a road network, according to an example embodiment of the present disclosure.

As shown in FIG. 6, the apparatus may include a public transport line dividing module 601, a matching vertex set determining module 602, and a matching module 603.

The public transport line dividing module 601 may divide a public transport line into segments and determine a dividing point of each of the segments.

The matching vertex set determining module 602 may determine a matching vertex set associated with the dividing point on a road network.

The matching module 603 may determine a road matching the public transport line from the road network, in which the determined road passes a point in each matching vertex set and closed polygons surrounded by the determined road and the public transport line have a smallest sum of areas.

According to an embodiment of the present disclosure, the matching module 603 may make a vertical line from each point in each matching vertex set to the public transport line to form closed polygons, and determine the road matching the public transport line from the road network. In this case, the determined road passes a point in each matching vertex set and the closed polygons surrounded by the determined road and the public transport line have a smallest sum of areas.

In order to solve the self-intersection, according to an embodiment of the present disclosure, the public transport line dividing module 601 may divide the public transport line into the segments and determine the dividing point of each of the segments, in which each of the segments does not intersect with the public transport line.

According to an embodiment of the present disclosure, the matching vertex set determining module 602 may preconfigure a radius threshold, and determine the matching vertex set associated with the dividing point on the road network. In this case, each point in the matching vertex set is within a range of the radius threshold.

According to an embodiment of the present disclosure, a same radius threshold may be configured for all of the dividing points. According to another embodiment of the present disclosure, different radius threshold may be configured for different dividing points.

According to an embodiment of the present disclosure, the matching module 603 may determine the road matching the public transport line from the road network using a shortest path algorithm. In this case, the shortest path algorithm may be the Dijkstra algorithm.

The above-mentioned modules in the example embodiments of the present disclosure may be deployed either in a centralized or a distributed configuration; and may be either merged into a single module, or further split into a plurality of sub-modules.

As can be seen from the above technical scheme, according to various embodiments of the present disclosure, a public transport line is divided into segments and a dividing point of each of the segments is determined. For each dividing point, a matching vertex set associated with the dividing point on a road network is determined. A road matching the public transport line is determined from the road network, in which the determined road passes a point in each matching vertex set and closed polygons surrounded by the determined road and the public transport line have a smallest sum of areas. When the embodiments of the present disclosure are employed, a surrounding area is configured as a measurement for the matching degree between the public transport line and the road network, so that the public transport line can match the road network, which has advantages like high efficiency, anti-noise, etc. In addition, under the condition of complex road network and the collection of the public transport lines is not accurate enough, the best-matching road is still able to be found.

The above-mentioned modules in the example embodiments of the present disclosure may be software (e.g., machine readable instructions stored in a non-transitory computer readable medium and executable by a processor), hardware (e.g., the processor of an Application Specific Integrated Circuit (ASIC)), or a combination thereof. For example, a hardware module may comprise dedicated circuitry or logic that is permanently configured (e.g., as a special-purpose processor, such as a field programmable gate array (FPGA) or an ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Those skilled in the art may understand that all or part of the procedures of the methods of the above embodiments may be implemented by hardware modules following computer readable instructions. The computer readable instructions may be stored in a computer-readable storage medium and may include a plurality of instructions for making a computer apparatus (which may be a mobile phone, a personal computer, a server or a network apparatus) implement the methods recited in the examples of the present disclosure. The storage medium may be diskette, CD, ROM (Read-Only Memory) or RAM (Random Access Memory), and etc.

What has been described and illustrated herein is an embodiment of the disclosure along with some of its variations. The terms, descriptions and figures used herein are set forth by way of illustration only and are not meant as limitations. Many variations are possible within the spirit and scope of the disclosure, which is intended to be defined by the following claims and their equivalents in which all terms are meant in their broadest reasonable sense unless otherwise indicated.

The invention claimed is:

1. A method for matching public transport lines with a road network, comprising:
   dividing, using a processor unit, a public transport line into segments and determining a dividing point of each of the segments;
   determining, using the processor unit, a matching vertex set associated with the dividing point on a road network; and
   determining, using the processor unit, a road matching the public transport line from the road network;
   wherein the determined road passes a point in each matching vertex set and closed polygons surrounded by the determined road and the public transport line have a smallest sum of areas.

2. The method of claim 1, wherein the operation of determining the road matching the public transport line from the road network comprises:
   making a vertical line from each point in each matching vertex set to the public transport line to form closed polygons; and
   determining the road matching the public transport line from the road network;
   wherein the determined road passes a point in each matching vertex set and the closed polygons surrounded by the determined road and the public transport line have a smallest sum of areas.

3. The method of claim 1, wherein the operation of dividing the public transport line into the segments and determining the dividing point of each of the segments comprises:
   dividing the public transport line into the segments and determining the dividing point of each of the segments;
   wherein each of the segments does not intersect with the public transport line.

4. The method of claim 1, wherein the operation of determining the matching vertex set associated with the dividing point on the road network comprises:
   preconfiguring a radius threshold; and
   determining the matching vertex set associated with the dividing point on the road network;
   wherein each point in the matching vertex set is within a range of the radius threshold.

5. The method of claim 1, wherein the operation of determining the road matching the public transport line from the road network comprises:
   determining the road matching the public transport line from the road network using a shortest path algorithm.

6. An apparatus for matching public transport lines with a road network, comprising:
   a public transport line dividing module, configured to divide a public transport line into segments and determine a dividing point of each of the segments;
   a matching vertex set determining module, configured to determine a matching vertex set associated with the dividing point on a road network; and
   a matching module, configured to determine a road matching the public transport line from the road network;
   wherein the determined road passes a point in each matching vertex set and closed polygons surrounded by the determined road and the public transport line have a smallest sum of areas.

7. The apparatus of claim 6, wherein the matching module is configured to:
   make a vertical line from each point in each matching vertex set to the public transport line to form closed polygons; and determine the road matching the public transport line from the road network;

wherein the determined road passes a point in each matching vertex set and the closed polygons surrounded by the determined road and the public transport line have a smallest sum of areas.

8. The apparatus of claim 6, wherein the public transport line dividing module is configured to:

divide the public transport line into the segments and determine the dividing point of each of the segments;

wherein each of the segments does not intersect with the public transport line.

9. The apparatus of claim 6, wherein the matching vertex set determining module is configured to:

preconfigure a radius threshold; and determine the matching vertex set associated with the dividing point on the road network;

wherein each point in the matching vertex set is within a range of the radius threshold.

10. The apparatus of claim 6, wherein the matching module is configured to:

determine the road matching the public transport line from the road network using a shortest path algorithm.

11. The method of claim 2, wherein the operation of determining the road matching the public transport line from the road network comprises:

determining the road matching the public transport line from the road network using a shortest path algorithm.

12. The method of claim 3, wherein the operation of determining the road matching the public transport line from the road network comprises:

determining the road matching the public transport line from the road network using a shortest path algorithm.

13. The method of claim 4, wherein the operation of determining the road matching the public transport line from the road network comprises:

determining the road matching the public transport line from the road network using a shortest path algorithm.

14. The apparatus of claim 7, wherein the matching module is configured to:

determine the road matching the public transport line from the road network using a shortest path algorithm.

15. The apparatus of claim 8, wherein the matching module is configured to:

determine the road matching the public transport line from the road network using a shortest path algorithm.

16. The apparatus of claim 9, wherein the matching module is configured to:

determine the road matching the public transport line from the road network using a shortest path algorithm.

* * * * *